(12) United States Patent
Laberteaux et al.

(10) Patent No.: US 7,970,540 B2
(45) Date of Patent: *Jun. 28, 2011

(54) SYSTEM AND METHOD OF VEHICULAR WIRELESS COMMUNICATION USING AN INTEGRATED COORDINATING ACCESS POINT

(75) Inventors: Kenneth P. Laberteaux, Ann Arbor, MI (US); Tony K. Mak, San Francisco, CA (US); Raja Sengupta, Berkeley, CA (US)

(73) Assignees: Toyota Motor Engineering & Manufacturing North America, Inc., Erlanger, KY (US); The Regents of the University of California, Oakland, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/718,865

(22) PCT Filed: Nov. 8, 2005

(86) PCT No.: PCT/US2005/040385
§ 371 (c)(1),
(2), (4) Date: Jul. 6, 2007

(87) PCT Pub. No.: WO2006/052944
PCT Pub. Date: May 18, 2006

(65) Prior Publication Data
US 2009/0138196 A1 May 28, 2009

Related U.S. Application Data

(60) Provisional application No. 60/625,905, filed on Nov. 8, 2004, provisional application No. 60/625,902, filed on Nov. 8, 2004, provisional application No. 60/625,843, filed on Nov. 8, 2004, provisional application No. 60/625,849, filed on Nov. 8, 2004.

(51) Int. Cl.
*G01C 21/00* (2006.01)
(52) U.S. Cl. ........ 701/213; 701/36; 701/66; 340/426.16
(58) Field of Classification Search .................... 701/33, 701/36, 66, 213; 455/41.2, 511, 515, 555; 342/357.09, 357.1; 340/995.13, 426.16
See application file for complete search history.

(56) References Cited

U.S. PATENT DOCUMENTS 5,164,904 A 11/1992 Sumner
5,440,560 A 8/1995 Rypinski
(Continued)

FOREIGN PATENT DOCUMENTS
EP 1089088 4/2001
(Continued)

OTHER PUBLICATIONS

U.S. Appl. No. 11/718,868; U.S. Appl. No. 11/718,832 corresponding to USPUB above.*

(Continued)

*Primary Examiner* — Gertrude Arthur Jeanglaud

(57) ABSTRACT

A system and method of vehicular wireless communication over a Dedicated Short Range Communication service band. The system and method include a vehicle having a navigation system, a processor, and a communication system for transmitting a message via a wireless communications link. The system and method also include a control channel for communicating a safety communication and a service channel for communicating a non-safety communication.

20 Claims, 9 Drawing Sheets

U.S. PATENT DOCUMENTS

| | | |
|---|---|---|
| 5,973,609 A | 10/1999 | Schoch |
| 6,091,741 A | 7/2000 | Fujiwara et al. |
| 6,114,968 A | 9/2000 | Ramakrishnan et al. |
| 6,707,378 B2 | 3/2004 | MacNeille et al. |
| 6,714,559 B1 | 3/2004 | Meier |
| 6,804,602 B2 | 10/2004 | Impson et al. |
| 7,009,501 B2 | 3/2006 | Olch |
| 7,019,636 B2 | 3/2006 | Vollmer et al. |
| 7,034,678 B2 | 4/2006 | Burkley et al. |
| 7,068,633 B1 | 6/2006 | Ho |
| 7,103,470 B2 | 9/2006 | Mintz et al. |
| 7,236,797 B2 | 6/2007 | Kimoto et al. |
| 2002/0150050 A1 | 10/2002 | Nathanson |
| 2003/0012166 A1 | 1/2003 | Benveniste |
| 2003/0053437 A1 | 3/2003 | Bahl et al. |
| 2003/0146852 A1 | 8/2003 | O'Dell |
| 2004/0037258 A1 | 2/2004 | Scherzer et al. |
| 2004/0043767 A1 | 3/2004 | Tsutsumi et al. |
| 2004/0110508 A1 | 6/2004 | Haartsen |
| 2004/0180655 A1 | 9/2004 | Jang et al. |
| 2004/0204069 A1 | 10/2004 | Cui et al. |
| 2004/0219937 A1 | 11/2004 | Sugar et al. |
| 2005/0195776 A1 | 9/2005 | Xu |
| 2006/0009228 A1 | 1/2006 | Kang et al. |
| 2007/0299571 A1* | 12/2007 | Laberteaux et al. ............ 701/24 |
| 2009/0138197 A1* | 5/2009 | Laberteaux et al. .......... 701/213 |

FOREIGN PATENT DOCUMENTS

| | | |
|---|---|---|
| EP | 1489578 | 12/2004 |
| EP | 1517271 | 3/2005 |

OTHER PUBLICATIONS

Motamedi, A.; Aghajan, H; Bahai, A; Throughput persistence of scalable mobile ad-hoc networks: evaluation and enhancement, vol. 4, p. 2868-2872.

K. Laberteaux, R. Sengupta, T. Mak, A Group Manager that Guarantees Full Safety Exchanges Within a Vehicular, Multi-Channel, Wireless Service Environment, Oct. 13, 2004, pp. 1-24.

* cited by examiner

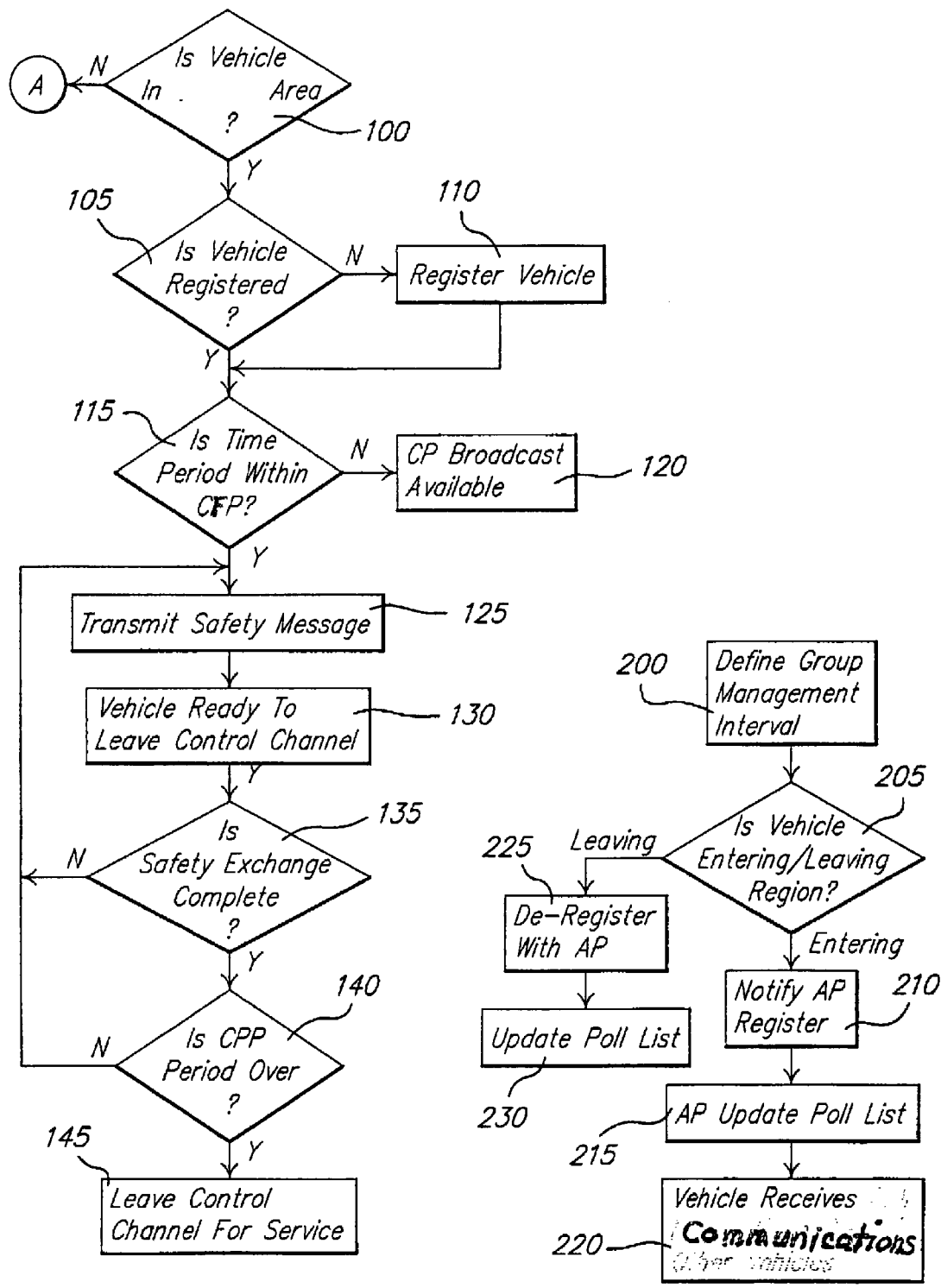

SYSTEM AND METHOD OF VEHICULAR WIRELESS COMMUNICATION USING AN INTEGRATED COORDINATING ACCESS POINT

REFERENCE TO RELATED APPLICATION

This application claims priority to U.S. provisional patent application Ser. Nos. 60/625,905, filed Nov. 8, 2004, 60/625,902 filed Nov. 8, 2004, 60/625,843 filed Nov. 8, 2004, and 60/625,849 filed Nov. 8, 2004, the content of said applications being incorporated herein by reference in their entirety.

BACKGROUND OF THE INVENTION

1. Field of the Invention

The present invention relates generally to a wireless communication, and more specifically, to a system and method of managing wireless vehicular communication using an integrated coordinating access point.

2. Description of the Related Art

Intelligent navigation involves the delivery of information to a vehicle operator. The information may have a safety content, or a commercial content. Various types of safety information are useful, such as a warning regarding a collision with another vehicle. Similarly, various types of commercial information are useful, such as high speed tolling, maps, road conditions, the location of retail establishments, entertainment media and other types of infotainment. The information is communicated to the vehicle operator in a variety of ways, such as a display device or a screen integral with the instrument panel, or through an auditory output device.

One feature of an intelligent navigation system is the integration of a global positioning system (GPS) with the vehicle to automatically determine the location of the vehicle. The GPS may be a handheld device or integral with the vehicle. The global positioning system includes a signal transmitter, a signal receiver, and a signal processor. The GPS, as is known in the art, utilizes the concept of time-of-arrival ranging to determine position. The global positioning system includes a signal receiver in communication with a space satellite transmitting a ranging signal. The position of the signal receiver can be determined by measuring the time it takes for a signal transmitted by the satellite at a known location to reach the signal receiver in an unknown location. By measuring the propagation time of signals transmitted from multiple satellites at known locations, the position of the signal receiver can be determined. NAVSTAR GPS is an example of a GPS that provides worldwide three-dimensional position and velocity information to users with a receiving device from twenty-four satellites circling the earth twice a day.

In order to facilitate wireless vehicular communication, the Federal Communications Commission (FCC) has allocated 75 MHz of the wireless spectrum in the 5.9 GHz range for Dedicated Short Range Communication Services (DSRC). At the same time, the FCC has mandated that safety communications have priority over non-safety communications. The DSRC band plan includes seven channels, each encompassing 10 MHz. One of the seven channels is identified as a control channel used for establishing communication links between vehicles and roadside access points, and links connecting one vehicle to another vehicle. The other six channels are service channels, for providing infotainment information.

The safety channel has a data latency, such as 100 ms, which is generally more stringent than the latency period of a non-safety channel. A desirable feature of such a system is that the information transmitted by one channel not interfere with other communications on another channel. Thus, there is a need in the art for a wireless vehicular communications protocol that utilizes the intelligent navigation system onboard the vehicle in order to provide the operator with additional information and facilitate communication between vehicles and integrated coordinating access points.

SUMMARY OF THE INVENTION

Accordingly, the present invention is a system and method of vehicular wireless communication over a Dedicated Short Range Communication service band using an integrated coordinating access point. The system includes a vehicle having a navigation means, a processor, and a communication means for transmitting a message via a wireless communications link. The system includes a control channel for communicating a safety communication and a service channel for communicating a non-safety communication. The control channel is subdivided into a contention-free period having a group management interval, a service announcement interval and a safety exchange interval of time for transmitting a safety communication and a contention period having a non-safety service interval of time for transmitting a non-safety communication. The system further includes an integrated coordinating access point in communication with the vehicle via the communications link within region.

The method includes the steps of determining if the vehicle is within communications range of the region, determining if the vehicle is registered with the integrated coordinating access point and, if the vehicle is within the communications range of the integrated coordinating access point, determining if a current time is within the safety exchange interval, and transmitting the safety communication by each registered vehicle during the safety exchange interval at the predetermined time for each registered vehicle. The method further includes the steps of determining if the safety communication exchange by every registered vehicle is completed, and permitting the vehicle to leave the control channel if the safety communication exchange is complete, and determining if a current time is within a contention period, and transmitting the non-safety communication if the current time is within the contention period.

One advantage of the present invention is that a system and method of managing wireless vehicular communication is provided that manages safety and service information transmitted to and from the vehicle over a wireless communications network. Another advantage of the present invention is that a system and method of managing wireless vehicular communication is provided that is cost effective to implement. Still another advantage of the present invention is that a system and method of managing wireless vehicular communication is provided that may be incorporated in the vehicle navigation system. A further advantage of the present invention is that a system and method of managing wireless vehicular communication is provided that maximizes the amount of time a vehicle can spend on the service channel within a region.

Other features and advantages of the present invention will be readily appreciated, as the same becomes better understood after reading the subsequent description taken in conjunction with the accompanying drawings.

BRIEF DESCRIPTION OF THE DRAWINGS

FIG. 5 is a flowchart of a method managing vehicular communication, according to the present invention.

FIG. 6 is a flowchart of a method of registering a vehicle using the system and method according to the present invention.

DESCRIPTION OF THE PREFERRED EMBODIMENT(S)

Figure 1:
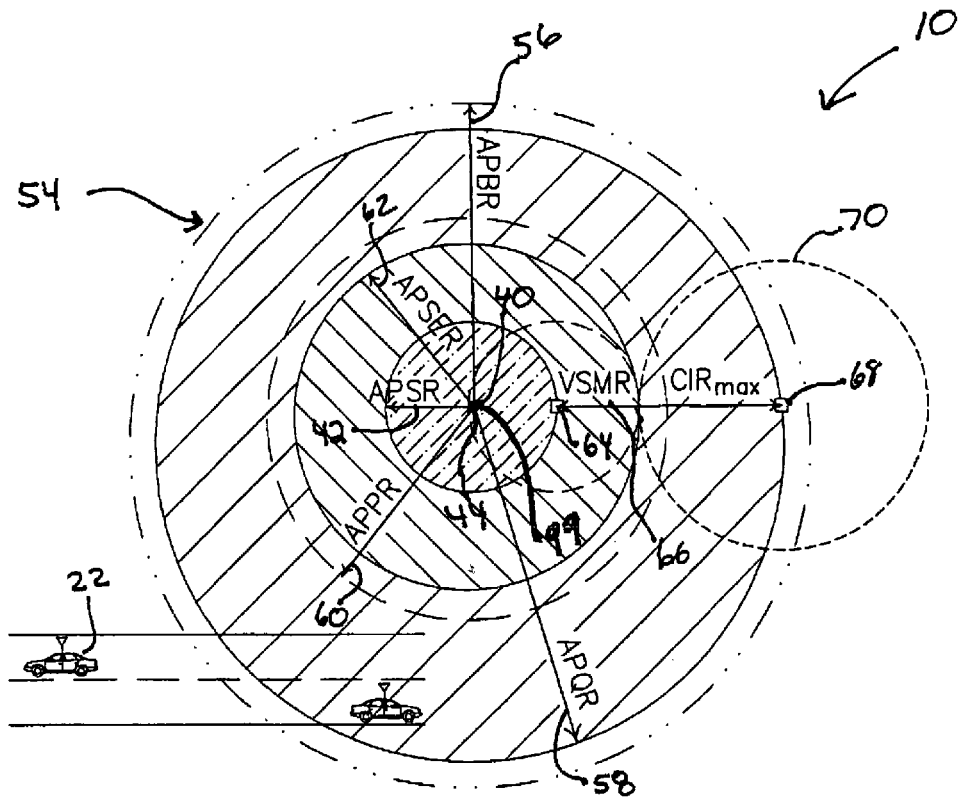
FIG. 1 is a diagram of a service region for use with a system and method of vehicular wireless communication, according to the present invention.

Referring to FIGS. 1-4 and 20, a system 10 of managing wireless vehicular communication within a region is provided. In this example, the vehicle is an automotive vehicle 22, although it is contemplated that it can be utilized on other types of vehicles, such as boats or planes or trains. Various uses of the system 10 are foreseeable beyond facilitating communications to and from automotive vehicles 22.

The system includes a vehicle having a navigation means 12. The navigation means 12 is typically integral with the vehicle 22. The navigation means 12 receives various vehicle-related inputs, processes the inputs and communicates the resulting information in a predetermined manner, to be described. For example, the information may be transmitted to a receiving source such as another vehicle, or to an access point or the like.

The vehicle 22 includes a processor 16 that is operatively in communication with the navigation means 12. The processor 16 includes a memory, as is known in the art. The processor receives information from various sources, and processes the information in a manner to be described. For example, the processor receives information from various vehicle inputs 14. One example of a vehicle input may be a safety communication transmitted by another vehicle. Another example of a vehicle input is vehicle speed. This can be measured by a speed sensor operatively in communication with a processor on board the vehicle. Still another example of an input signal is vehicle yaw rate. This can be measured using a sensor associated with the vehicle brake system. Other relevant inputs may also be sensed, such as using a light sensor, a time sensor, or a temperature sensor.

Still another example of an input is actual vehicle geographic location. This information can be obtained from various sources, such as a compass, or a visual recording device, such as a camera, or from a global positioning system 18, or GPS. In this example, the GPS includes a global positioning transceiver in communication with the navigation means 12 that is also in communication with a GPS signal transmitter. The GPS signal transmitter is a satellite-based radio navigation system that provides global positioning and velocity determination. The GPS signal transmitter includes a plurality of satellites strategically located in space that transmit a radio signal. The GPS transceiver uses the signals from the satellites to calculate the location of the vehicle. The GPS transceiver may be integral with the navigation system on board the vehicle or separable.

The vehicle 10 further includes a user notification device 28 operatively in communication with the navigation means 12. One example of a user notification device 28 is a display screen. The display screen displays information relevant to the system and method. For example, the display screen displays a warning message relating to collision notification, so that the driver can take the appropriate corrective action. Another example of a user notification device 28 is an audio transmission device that plays an audio message through speakers associated with an audio transceiver on the vehicle, such as the radio.

The vehicle 10 also includes a user manual input mechanism 30 which is operatively in communication with the centrally located processor 16 via the communication link 26. The manual user input mechanism 30 can be a keypad or a touchpad sensor on the display screen, or a voice-activated input or the like. The manual user input mechanism 30 allows the user to provide a manual input to the processor 16. The user input may be independent, or in response to a prompt on the display device.

The system 10 also includes an algorithm (to be described). The algorithm may be stored in a memory of a centrally located processor 20 associated with the roadside service units 24.

The vehicle includes a communication means 32 that transfers information via a wireless communications link 26. The communication means 32 operatively transmits a signal to others, such as other vehicles, or to an access point, or the like. The communication means 26 operatively receives a signal from others, such as other vehicles, an access point or the like. An example of a communication means 32 is a radio. Preferably, the vehicle radio can send or transmit on one channel at a time. The radio only broadcasts when polled, and listens the rest of the time. The radio transmits over the Dedicated Short Range Communication Services band. Within this band are seven channels of 10 MHz each. One of the channels is a control channel used to communicate between vehicles 22 and roadside access points 24, and the other six channels are service channels.

Figure 2:
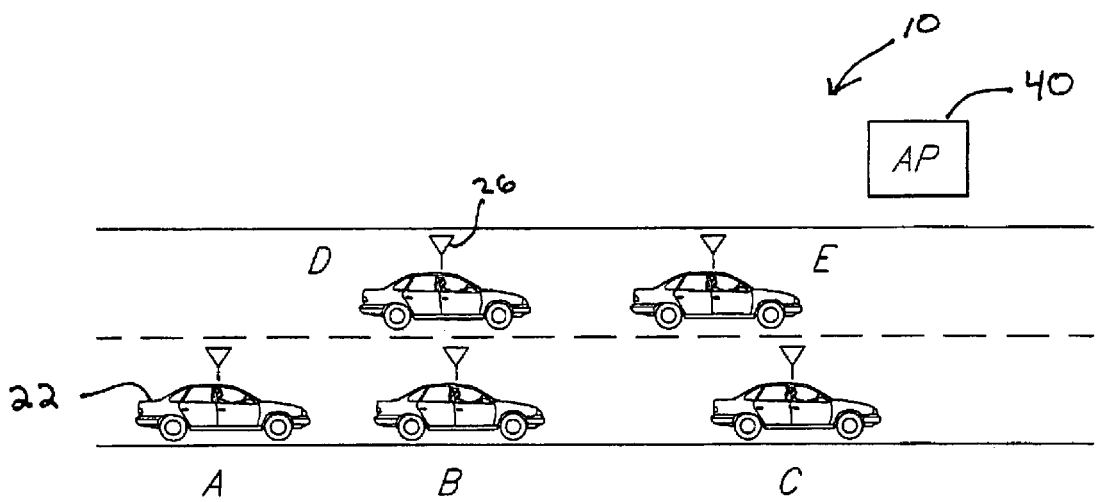
FIG. 2 is a diagram illustrating a system of vehicular wireless communication, according to the present invention.

FIG. 2 illustrates the transmission of multiple vehicles in a region. Advantageously, the time spent on the service channel is maximized, without missing a message on the safety channel. In this example, the wireless communications link 26 transfers information by broadcasting the information to all receivers in a predetermined region. In another example, the wireless communications link transfers information using point to point transfer of information. Another example of a wireless communications link 26 is a universal shortwave connectivity protocol referred to in the art as BLUETOOTH. Still a further example of a communications link 26 is the internet.

The communications means 32 exchanges safety communications with other vehicles within a predetermined vehicle safety message range (VMSR), and within a predetermined period of time, such as every 100 msec, in the control channel. The communications means may also conduct non-safety commercial transactions with a service providing access point.

It should be appreciated that the vehicles may include other components or features that are known in the art for such vehicles.

The system 10 may also include roadside information transceivers 24, also referred to as an access point, that is in communication with vehicles 10 within a predetermined region. The roadside information device 24 may be utilized to verify the location of the vehicle 22, or transmit information to or from the vehicle 22, or the like. An example of a roadside information transceiver 24 is a radio, or the like. The radio is preferably capable of two-way communications between the access point and the vehicle.

One example of an access point is a service access point 40, which is a roadside information transceiver that provides non-safety services. The service access point 40 provides its services within a predetermined access point service region (APSR), as shown at 42 in FIG. 1. The service access point 40 will advertise its services in the control channel, but conducts the transaction in a service channel. Preferably, only vehicles in the access point service region can utilize the services of the service access point. An example of a service access point is a retail establishment, or a tollbooth, or a traffic control device or an infotainment device or a travel service or the like. It should be appreciated that the service provided by the service access point is non-limiting.

Similarly, a coordinating access point 44 is a roadside information transceiver that coordinates the transmissions within a predetermined coordinating access point region. It should be appreciated that the predetermined region is proximate of the coordinating access point. It should also be appreciated that a single access point may function as both the service access point 44 and the coordinating access point 44. The coordinating access point 44 will coordinate the transmission of communications by vehicles located in the predetermined region, in a manner to be described. Various configurations are contemplated for coordinating communications. For example, the coordinating access point 44 is a dedicated coordinating access point co-located with one or more service access points 40, as shown in FIG. 1. The coordinating access point 44 has a radio dedicated to the control channel, and the service access points 40 have one or more radios dedicated to the service channels. In another example of an integrated coordinating access point, one roadside unit shares the service and coordinating access point responsibilities by cycling between the control and service channels every T seconds. In still another example of a shared coordinating access point, one coordinating access point coordinates a number of service access points at different locations within the region. It should be appreciated that these are examples of relationship schemes, and other relationship schemes between the coordinating access point and service access point are within the scope and intent of this system.

Figure 3:
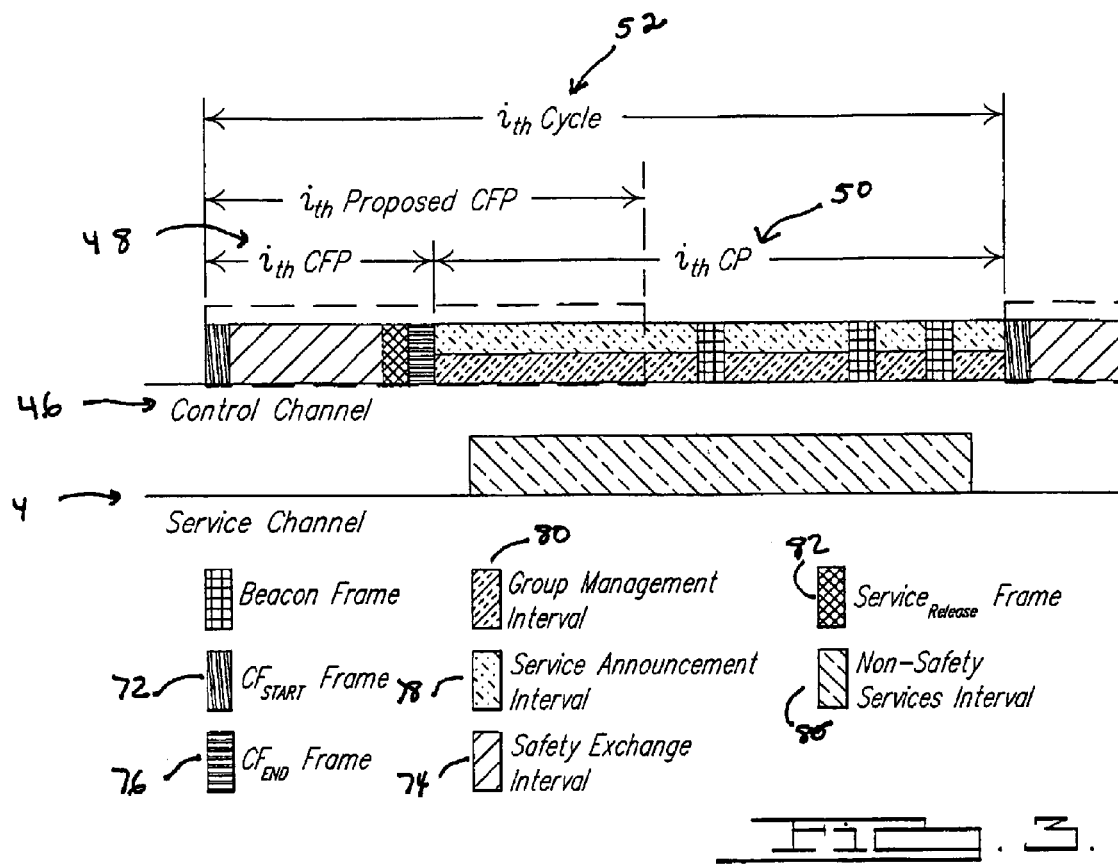
FIG. 3 is a diagram illustrating the channel architecture for the system of vehicular wireless communication, according to the present invention.

The coordinating access point 44 divides the control channel 46 by both space and time, as shown in FIG. 3. In the control channel 46, the time is partitioned in a predetermined manner, which in this example is a periodic, regulated interval called a repetition period 52. The system cycle is repeated every T msec, where T is the minimum safety message delay requirement so that a safety message is received within a predetermined period of time. Each T msec is further divided into two sub-periods, a regulated contention-free period (CFP) 48 and an unregulated contention period (CP) 50. During a CFP 48, each vehicle is individually polled so that is can transmit its communication. Only vehicles outside the predetermined region can transmit a message during the (CFP), so that there is no interference between the scheduled safety message and other communications.

Referring back to FIG. 1, an example of a predetermine region 54 is illustrated. In this example, the coordinating access point 44 and the service access point 40 are both located at the center of the region, as described for a dedicated coordinating access point. The region is divided spatially. For example, the access point beacon range is a circular area having a first transmission range shown at 56. The access point quiet range is a circular area having a second transmission range shown at 58. The access point poll range is a circular area having a third transmission range shown at 60. The access point safety exchange range is a circular area having a fourth transmission range shown at 62. The access point service range is a circular area having a fifth transmission range shown at 42. The vehicle is located in the region at 64, and has a vehicle safety message range with a circular area having a sixth transmission range shown at 66. Another vehicle is located in the region at 68, and has a circular maximum interference range having a seventh transmission range shown at 70.

It should be appreciated that the system 10 may include other components known in the art for facilitating communications between vehicles.

Figure 4:
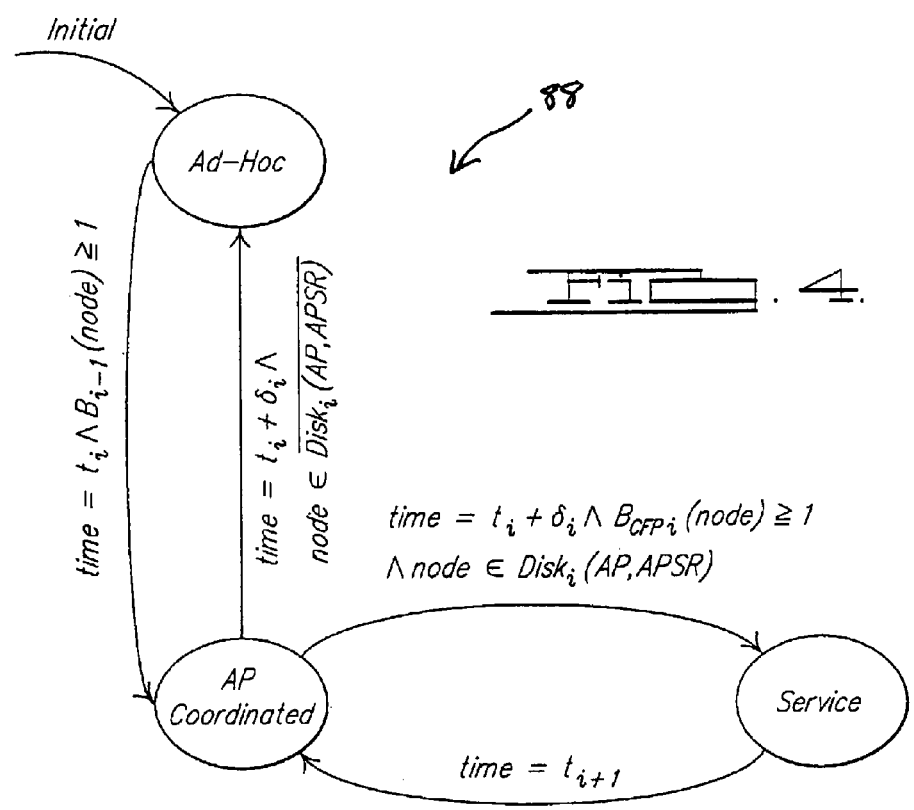
FIG. 4 is a diagram illustrating the relationship between modes of the system, according to the present invention.
Figure 20:
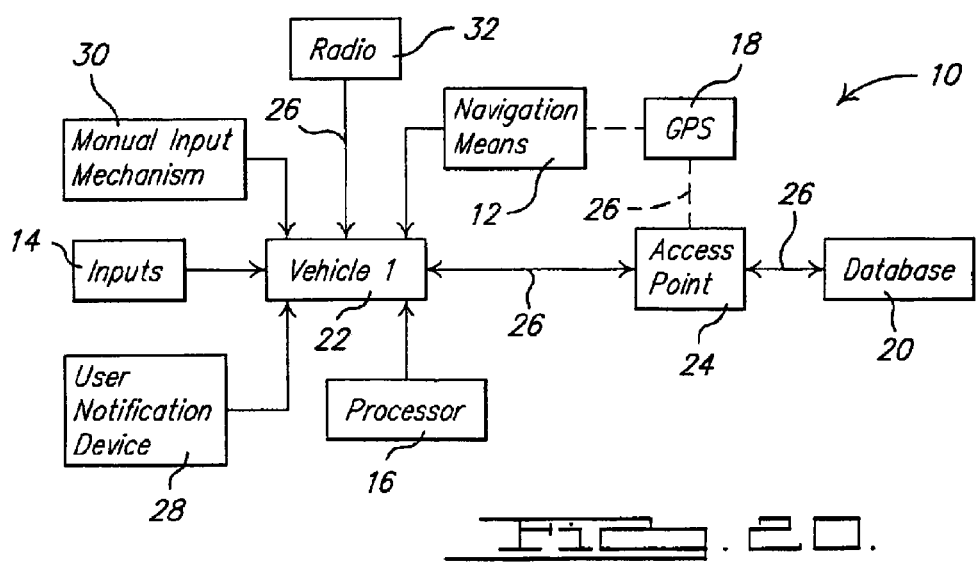
FIG. 20 is a block diagram illustrating the system of vehicular wireless communication, according to the present invention.

Referring to FIG. 5, a method of vehicular wireless communication using the system 10 described with respect to FIGS. 1, 4 and 20 is illustrated.

The methodology begins in block 100 with the step of determining if the vehicle 22 is within a region 54, and in particular if the vehicle is within transmission range of an access point beacon region 54. For example, the vehicle 22 notifies the service access point 40 that it is entering the region 60 during the group management time period, in order to participate in the safety exchange during the next contention-free period. The access point service region 42 is a geographic area containing one or more strategically placed roadside units, as previously described. When a vehicle 22 enters the access point service region 42, it receives a beacon from the service access point 40. The vehicle 22 will switch to the access point coordinated state at the beginning of each contention-free period 48 specified in the transmission from the service access point 40. In the access point coordinated state, the vehicles are coordinated by the access point in the control channel 46, and remain silent until polled by the access point. The vehicle 22 remains in the access point coordinated state for the duration of the contention-free period. When the contention-free period 48 is over, the vehicles outside of the region 42 switch back to an ad-hoc state, to be described. Vehicles inside the region 42 will switch to the service state if they received a beacon in the last contention-free period, otherwise they may remain in the access point coordinated state. In this example, the service access point 40 provides non-safety services, although it could provide other types of services. The service access point 40 may advertise its services over the control channel, but will conduct transactions over a service channel. For example, the vehicle may transmit a signal to the service access unit indicating that it has entered the service area.

If the vehicle is not in the beacon area 54, the methodology advances to circle A. In circle A, the vehicle transits communications in a default state, such as an Ad-Hoc state. The Ad-Hoc state may also be utilized in other situations, such as when the vehicle is outside the region or during the contention-free period. In the Ad-Hoc state, each vehicle exchanges safety messages at will. If the vehicle is in the poll area, the methodology advances to block 105.

In block 105, the methodology determines if the vehicle is registered. For example, the roadside unit determines if the vehicle is on a list of registered vehicles in the service area during the group management interval. If determined that the vehicle is not registered, the methodology advances to block 110. If determined that the vehicle is registered, the methodology advances to block 115.

In block 110, the vehicle is registered with the service access unit. An example of a registration process is described with respect to FIG. 6. After the vehicle is registered, the methodology advances to block 115.

In block 115, the methodology determines if the current time is within the contention-free period of time interval in the control channel. For example, a period of time is subdivided into two sub-periods, a regulated contention-free period 48 and an unregulated contention period. The contention-free period is further subdivided into time intervals. In the control channel 46, the intervals may include a start period interval 72, a safety exchange interval 74, an end interval 76, a service announcement interval 78, a group management interval 80, a service release frame interval 82, or the like. In the service channel 84, the interval is a non-safety exchange interval 86, or the like. An example of the contention-free period time interval structure is illustrated in FIG. 3 for the control channel and the service channel.

The service access point announces the beginning of the contention-free period 48. During the CFP 48, each vehicle within the region is individually polled and able to transmit its safety message, while the other vehicles in the area must remain silent. The contention period 50 follows the completion of the contention-free period 48. In the contention period 50, the vehicle located in the access point service region 42 can receive services by switching to the service channels. The other vehicles may send safety messages using another protocol, such as an ad-hoc protocol. The coordinating access points can also execute control functions in this interval in order to prepare for the next time cycle.

If the time period is not within the contention-free period, the methodology advances to block 120. In block 120, the time period is within the contention period, and the vehicle or the service access point may participate in non-safety related activities. For example, the vehicle may transact with the service access point. The service announcement interval may be used by the service access point to advertise the services offered on the service channel within the region.

In another example, the coordinating access point may perform other functions, such as group management functions, advertise available services, or transmit a signal to inform all vehicles of the upcoming contention-free period schedule. An example of a group management function is the registration process described with respect to FIG. 6.

Another example of a management function is establishing the order of transmitting. For example, in order to create a contention-free period in the ith cycle, the access point has to transmit beacons in the (i−1)th cycle, as shown in FIG. 4 at 88. Each vehicle that receives a beacon will update its network allocation vector (NAV) and remain silent during the contention-free period unless it is polled. Vehicles 22 that do not receive a beacon transmission during the contention period will operate in a default mode, such as the Ad-Hoc based protocol, during the next contention-free period. This may result in interference in reception of the polled message in the contention-free period. Since the control channel is not centrally scheduled during the contention period, the beacons sent by the server access point 40 have to vie for channel access like any vehicle 22, that is transmission and reception of a message is not guaranteed. To decrease the chance of message failure, the server access point 40 may optionally repeat its communication multiple times. Therefore, vehicles 22 that receive at least one beacon in the (i−1)th cycle will set their network allocation vector (NAV) until the end of the ith contention-free period, so as not to interfere during the ith contention-free period.

Returning to block 115, if the time period is within the contention-free period 48, the methodology advances to block 125.

In block 125, during the safety exchange interval 74, each vehicle is individually polled, and can transmit its safety-related communications. It should be appreciated that every other vehicle in the access point quiet region 58 is silent while another is transmitting. As previously described, the region is spatially divided in order to ensure that all vehicles within the region send and receive all relevant safety messages during the contention-free period by transmitting a safety message over a Dedicated Short Range Communication (DSRC) network to a vehicle within a predetermined range. Since the message is safety related, it is important that the message be received by the vehicle in a short period of time with a high probability of reliability. The message may also be of interest to another vehicle in the vicinity of the first vehicle. In this example the message is transmitted in a broadcast format.

The methodology advances to block 130, and determines if the vehicle wants to leave the control channel. If the vehicle wants to leave the control channel, the methodology advances to block 135 and further determines if the current safety exchange interval 74 is over. When the safety exchange interval ends, vehicles outside of the service region 42 may switch back to the Ad-Hoc state, and vehicles inside of the region may switch to the service state, provided they received a beacon in the last contention-free period, otherwise the vehicle will remain in the access point coordinated state. In this example, each vehicle in the service region must send and receive all relevant safety messages during the safety exchange interval portion of the contention-free period, before moving to another channel, such as the service channels in the contention period. It should be appreciated that each vehicle in the region is required to execute a full safety exchange in the contention-free period. For example, a vehicle executes a full safety exchange when all safety messages generated by it within the last T seconds are received by all their intended recipients, and all messages intended for the vehicle and generated within the last T seconds are received by the vehicle.

For example, if APSER=APSR+VMSR, the maximum specified range of a safety message is limited to VMSR. All vehicles within the region must be polled by the access point within the CFP to engage each vehicle in the region to execute a full safety exchange.

If APPR=APSER+Speed*T, and Speed is the maximum possible speed of a vehicle, the poll must be sent with sufficient power to reach all vehicles within the region. The extra transmission distance Speed*T is used by the access point to notify vehicles that they are about to enter another region. If the current safety exchange interval 74 is not over, the methodology returns to block 125 and continues.

If determined that the safety exchange interval is complete, the methodology advances to block 140 and determines if the contention-free period 48 is complete.

If the contention-free period is not over, the methodology returns to block 125 and continues with the transmission of safety messages. If the contention-free period is over and the vehicle is in the service region 42, the methodology advances to block 145.

In block 145, the vehicle 22 can leave the control channel 46 for the service channel. It should be appreciated that the vehicle can perform any desired transmission in the service channel 84. The non-safety message may be related to a commercial transaction, such a toll collection, a movie or a map download or the like, or provide travel information, such as a map, road conditions, roadside attractions, restaurants, gas stations, or the like. In this example, the non-safety message is transmitted via the service access point 40. It is contemplated that the non-safety message will be transmitted over the service channel 84. It may be advantageous to maximize the available bandwidth between the service access point 40 and nearby vehicles. Since the channel bandwidth is fixed, the amount of time that a vehicle is tuned to the service channel is maximized, without interfering with the receipt of a safety message over the safety channel.

In this example, the vehicle is in the Ad-Hoc default state when not in the coordinated state. In the Ad-Hoc state, the vehicles exchange messages outside of a formal infrastructure. In the service channel state, the vehicle is permitted to leave the control channel until the beginning of the next contention-free period, at which point the vehicle must return to the control channel, and their system will switch back to the access point coordinated state.

Referring to FIG. 6, an example of a method of registering a vehicle within the region is provided. The access point maintains a list of vehicles in the region in order to establish the communication time slot for each vehicle. It should be appreciated that this methodology may be called for by the method of FIG. 5, such as after determining that the vehicle is entering the poll region, or before entering the service access point region. The methodology begins in block 200 with the step of identifying the start of the defined group management interval 80. In the group management interval 80, a vehicle entering or leaving the region notifies the access point of their presence, so that the access point may schedule the appropriate vehicles to transmit during the safety exchange. Vehicles within the region are polled during the contention-free period to transmit their safety message, as previously described. Thus, the access point transmits polling communications with sufficient power to cover every vehicle 22 in the region 60. Advantageously, each vehicle 22 entering the region 54 has at least one cycle to register with the access point. When the vehicle enters the region, it begins to receive a signal from the access point, irrespective of the time interval. In this example, the receipt of a signal causes the newly arrived vehicle to attempt to register at the next group management interval. It should be appreciated that the vehicle will attempt to register in each contention-free period until registration is complete.

The methodology advances to block 205 and it is determined if the vehicle is entering or leaving the region. If the vehicle is entering the region, the methodology advances to block 210. In block 210, the entering vehicle notifies the access point that it is entering the service region. The methodology advances to block 215 and the access point updates the poll list it maintains to include the new vehicle. The methodology advances to block 220 and the vehicle continues to receive communications, such as from the other vehicles or service access points.

Returning to block 205, if the vehicle is leaving the region, the methodology advances to block 225 and the vehicle is removed from the registry list maintained by the access point. It should be appreciated that a vehicle leaving the region may be at the outer edge of the communication range for the region. The access point may utilize additional criteria in order to maintain the list of vehicles in the region. For example, the vehicle that has been on the list the longest amount of time may be removed from the list. Other criteria are the vehicle with the weakest signal strength, or the vehicle with the longest transmission response silence, or based on signal speed.

The methodology advances to block 230 and the poll list for the region is updated by removing the designated vehicle leaving the region.

Figures 7, 8:
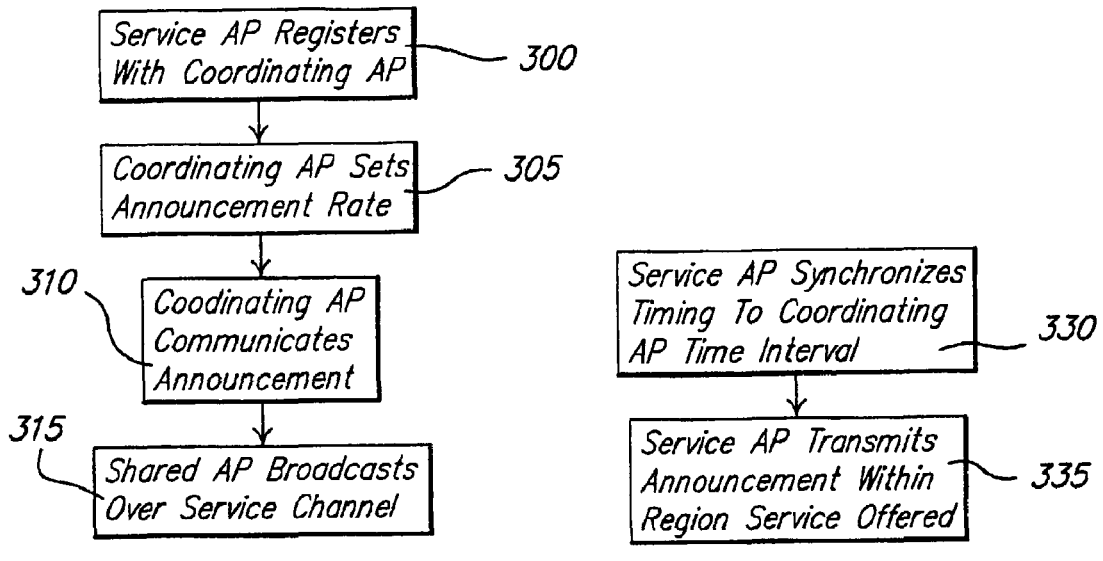
FIG. 7 is a flowchart of a method of coordinating communication on the control channel using a shared coordinating access point to make service announcements, according to the present invention.
FIG. 8 is a flowchart of another method of coordinating communication on the control channel using a service access point to make service announcements, according to the present invention.

Referring to FIG. 7, an example of a methodology for coordinating communications between multiple roadside service providers in overlapping service areas using a shared coordinating access point is illustrated. The access point may have two radios, one for coordinating the control channel, and another one for providing commercial services on the service channel. It should be appreciated that in a dense service area with multiple service providers and overlapping service regions, it is desirable to utilize a coordinating access point 44 which coordinates the control channel. The use of a coordinating access point advantageously minimizes the complexity of the system in a dense service area. The coordinating access point 44 advantageously manages the service access points 40 and vehicles receiving services from these providers.

Figure 11:
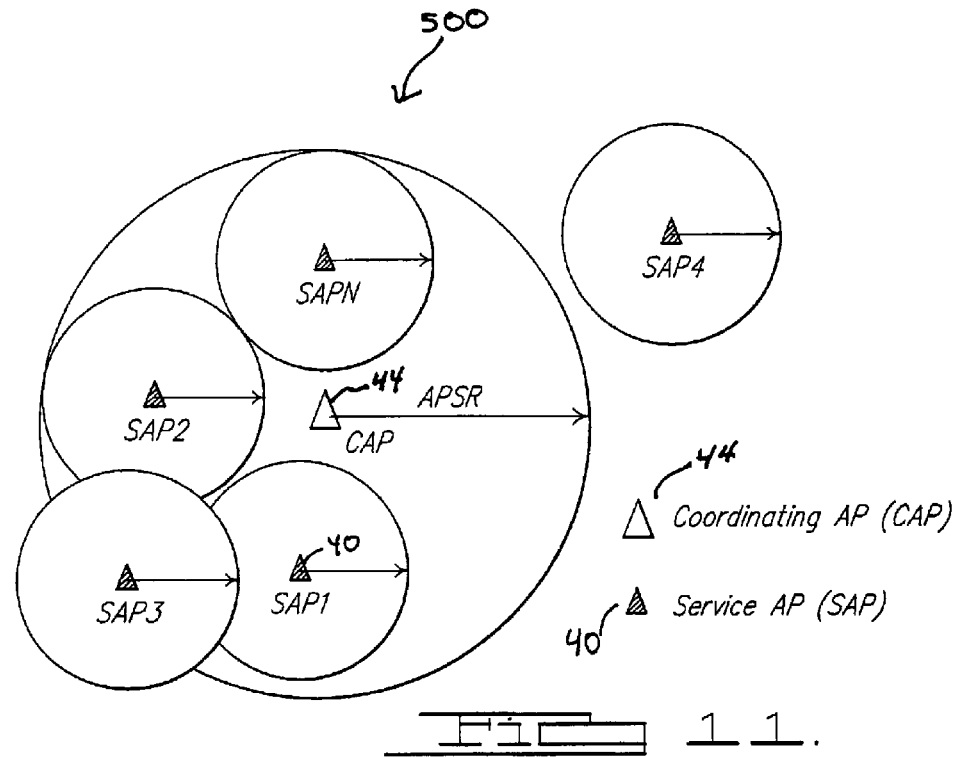
FIG. 11 is a diagram illustrating a shared service region for the methods of FIGS. 7 and 8, according to the present invention.

Referring to FIG. 11, a shared service region is illustrated at 500. The function of the coordinating access point 44 is to coordinate the control channel traffic for the region. As previously described, the coordinating access point divides the control channel by space and time.

The coordinating access point 44 periodically transmits a signal that contains the start time and the duration of the next contention-free period. It should be appreciated that any vehicle 22 receiving at least one signal from the access point will be regulated by the coordinating access point 44 in the next contention-free period. In the contention-free period, only vehicles which are polled can transmit, otherwise they are silent.

The coordinating access point 44 can have either a single radio for both channels, or multiple radios, where one radio is dedicated to the control channel and the other radios are for the service channels. In this example, there is one radio for the control channel and one radio for the service channels.

The method begins in block 300 with the step of each of the service access points 40 in the region providing the coordinating access point with a list of service announcements for the service access point. This may occur during the service access point management interval in the contention-free time period. The coordinating access point can manage the amount of broadcast time allocated to each service access point.

Figure 12:
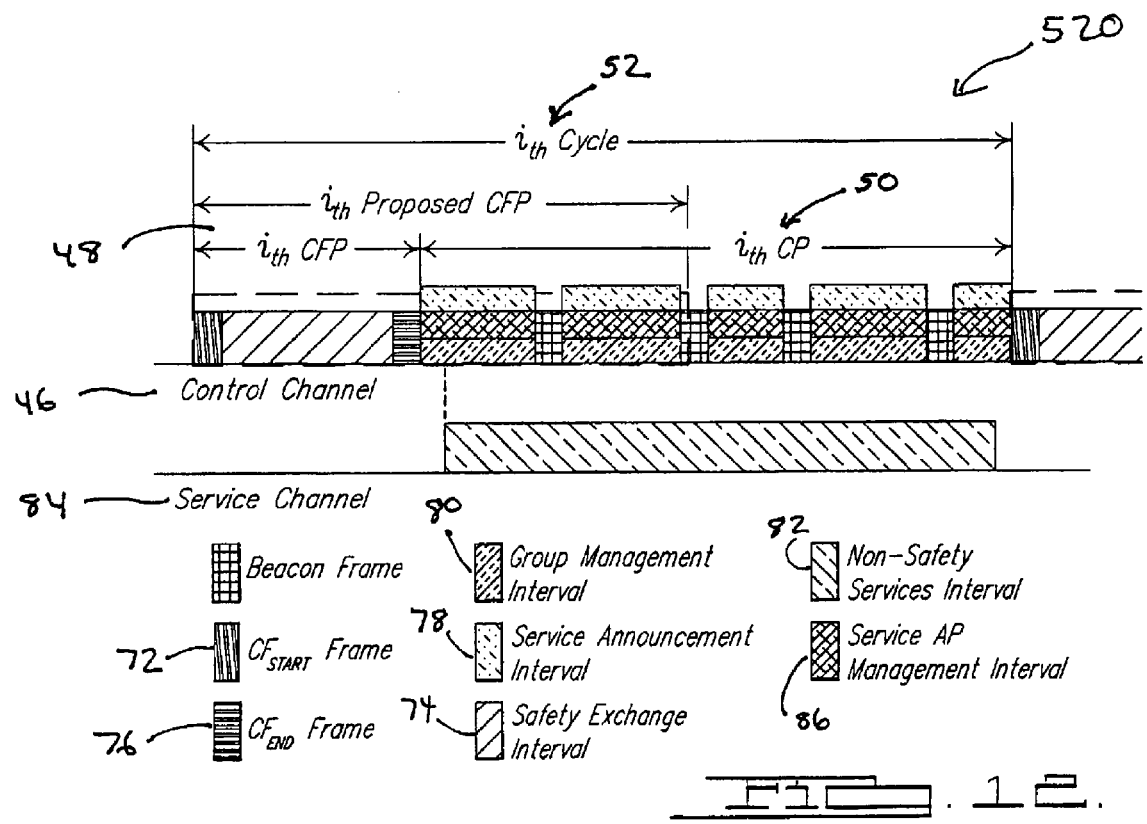
FIG. 12 is a diagram illustrating the method of FIG. 7 using the shared coordinating access point to transmit the service announcement in the contention period, according to the present invention.
Figure 13:
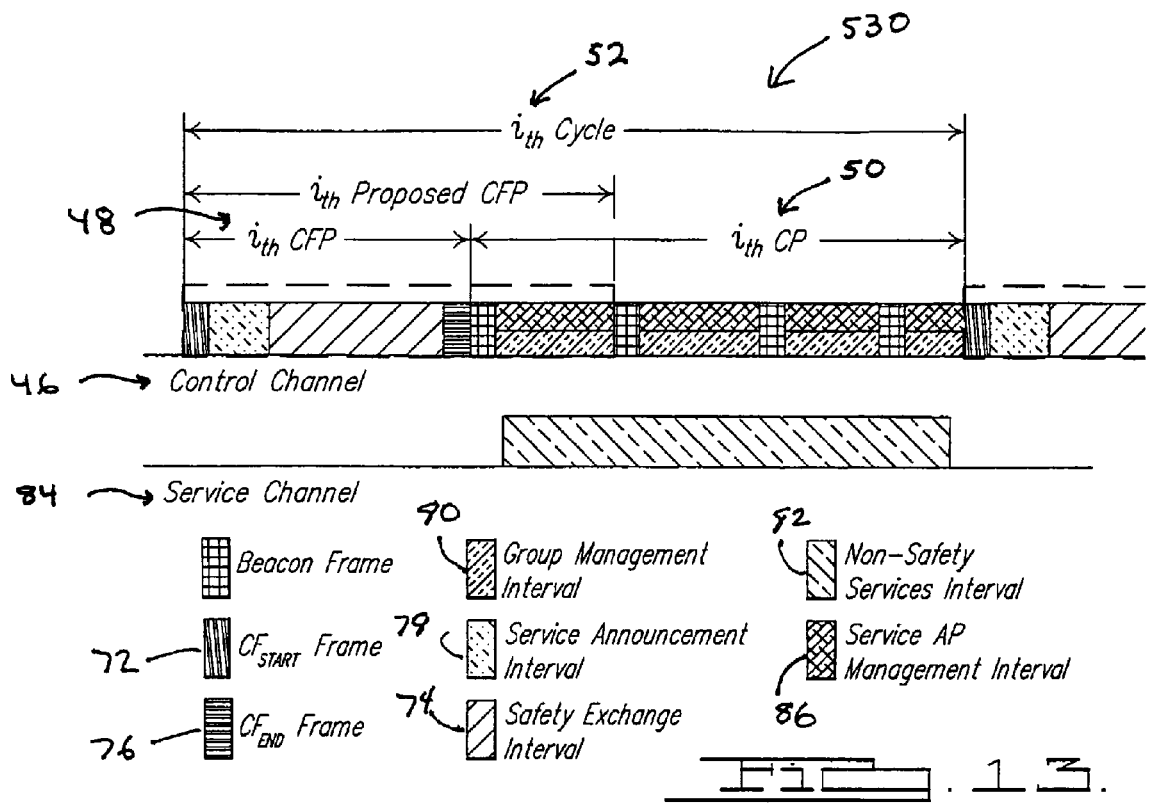
FIG. 13 is a diagram illustrating the method of FIG. 7 using the shared coordinating access point to transmit the service announcement in the contention-free period, according to the present invention.

In block 305, the coordinating access point 44 establishes the announcement rate for each service announcement. Advantageously, only one service access point will broadcast at a time. The methodology advances to block 310, and the shared coordinating access point transmits the announcements at a predetermined time. As illustrated in FIG. 12 at 520, the predetermined time is the service announcement interval occurring during the contention period. Similarly, as illustrated in FIG. 13 at 530, the predetermined time period is the service announcement interval occurring during the contention-free period.

It should be appreciated that in this example the service access points may not necessarily be co-located with the coordinating access points, since the region in which the service is offered may be different than the region in which the communication is transferred. Therefore a GPS-based service discovery mechanism may be utilized to determine the location of the service. For example, the vehicle may include a GPS capable of providing the vehicle driver with directions on how to arrive at the service location.

Figure 14:
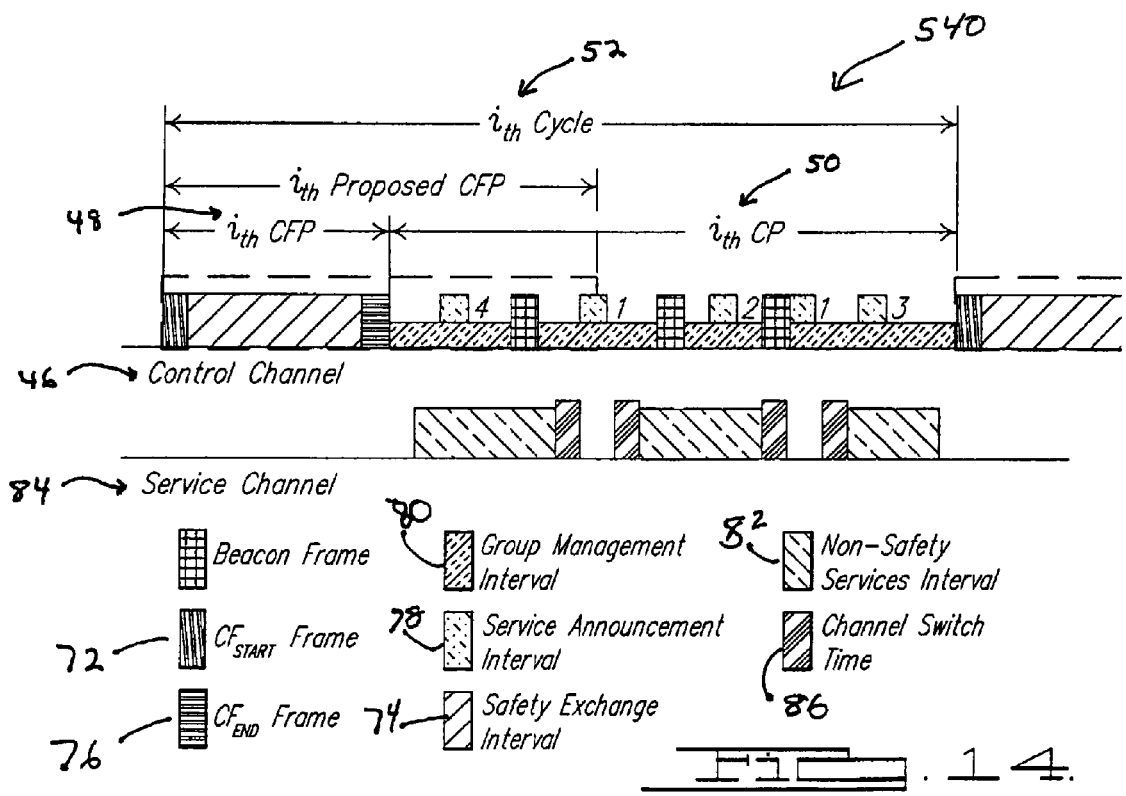
FIG. 14 is a diagram illustrating the method of FIG. 8 with the shared coordinating access point and the service access point transmitting the service announcement in the contention period, according to the present invention.
Figure 15:
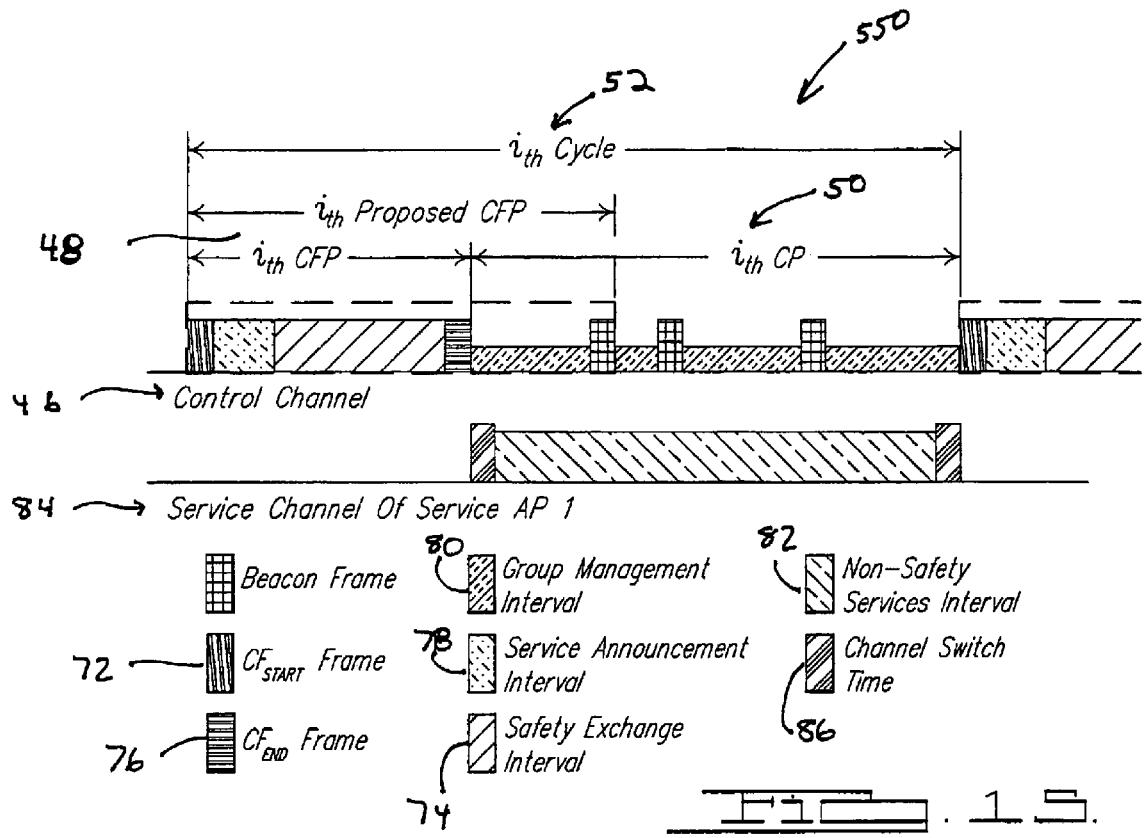
FIG. 15 is a diagram illustrating the method of FIG. 8 with the shared coordinating access point and the service access point transmitting the service announcement in the contention-free period, according to the present invention.

Referring to FIG. 8, another example of a shared coordinating access point is provided in which each service access point transits their own announcement during the predetermine time period. It should be appreciated that the service access point synchronizes with the coordinating access point's time cycle. The methodology begins in block 330 the service access point 40 synchronizes the timing of the service communication to correspond with the time interval set by the coordinating access point 44. In this example, the coordinating access point 44 does not need to be aware of the service access points 40, thus the service access point management interval is not required. However, each service access point 40 must be able to synchronize to the coordinating access point's system cycle. In this example, each service access point 40 transmits its own service announcement in their own service region where the service is offered. As illustrated in FIG. 14 at 540, the service announcement interval 78 is in the contention period. In this example, the service announcement is transmitted on the control channel 46 in the contention period 50, and each service access point 40 has to disrupt service and return to the control channel for the service announcement. Similarly, as illustrated in FIG. 15 at 550, the service access points 40 transmit their service announcement in the contention-free period 48.

In block 335, each service access point transmits their service signal in the region in which the service is offered during the service announcement interval. Preferably, if a vehicle within the region receives the communication, it is implied that the vehicle is within the service region of the service access point.

Figures 9, 10:
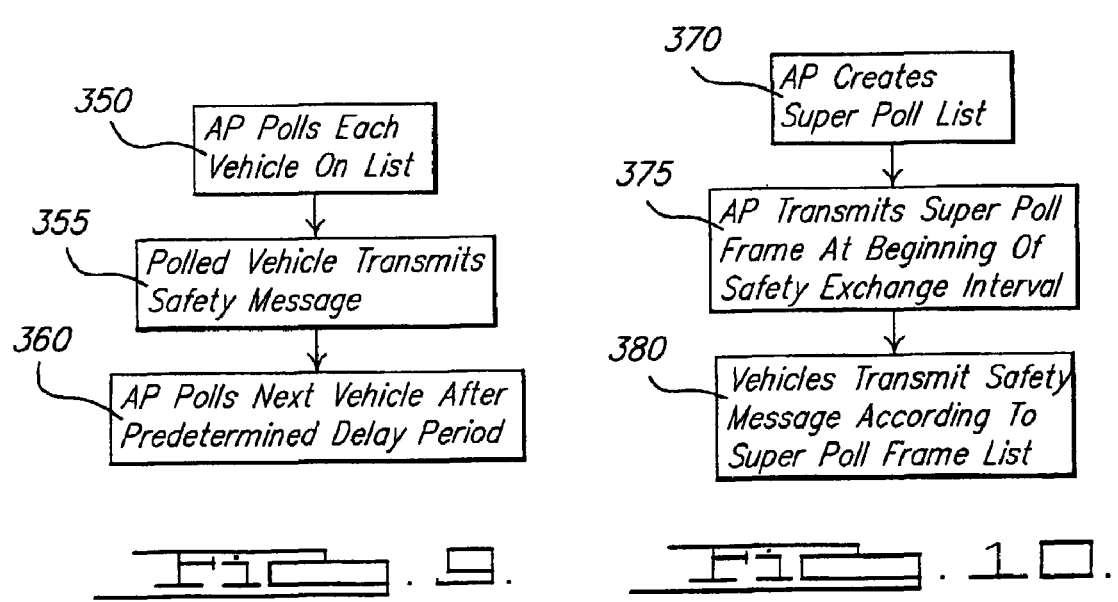
FIG. 9 is a flowchart of a method of polling vehicles by the access point using the system and method of the present invention.
FIG. 10 is a flowchart of another method of polling vehicles by the access point using the system and method of the present invention.

Referring to FIG. 9, an example of a single poll method of informing vehicles within the region of their time slot for providing their safety communication within the safety exchange is provided interval. It should be appreciated that the access point may be a service access point or a coordinating access point, as previously described. The access point assigns a fixed time slot to the vehicle to broadcast its safety message to all vehicles within the service region. The single poll methodology may be preferable in a noisy channel environment The methodology begins in block 350 with the access point individually polling each registered vehicle on its poll list, and inviting the specified vehicle to transmit its safety message. For example, each communication is transmitted with enough power to cover every vehicle within the service region.

In block 355, the vehicle transmits its safety message at the designated time. The methodology advances to block 360, and the access point polls the next vehicle on the list after a predetermined delay period. It should be appreciated that if the access point receives a message from the polled vehicle that it has no safety message to transmit, then the access point may immediately poll the next vehicle after the predetermined time delay.

Referring to FIG. 10, another example of a multiple poll method of informing vehicles within the region of their time slot for providing their safety communication within the safety exchange interval is provided. The multiple poll method is similar to the single poll method, but eliminates the delay and header transmission time for each polled transmission. If the channel is not too noisy, only one multiple poll frame transmission may be required.

The methodology begins in block 370 with the step of the coordinating access point creating a super poll list containing the complete schedule of every registered vehicle on its poll list.

The methodology advances to block 375, and the access point transmits the super poll list at the predetermined time period, which in this example is at the beginning of the safety exchange interval. Preferably, the super poll list is transmitted with enough power to reach every vehicle 22 within the region 54. The super poll list includes entries containing the address of the vehicle and its schedule. Preferably, there is a time interval between two consecutive scheduled transmissions. After the access point transmits the super poll list, it remains silent for rest of the safety exchange interval. The methodology advances to block 380 and the vehicle receives the super poll frame, and from the list extracts its scheduled transmission time. The vehicle is silent until its appointed transmission time.

Figure 16:
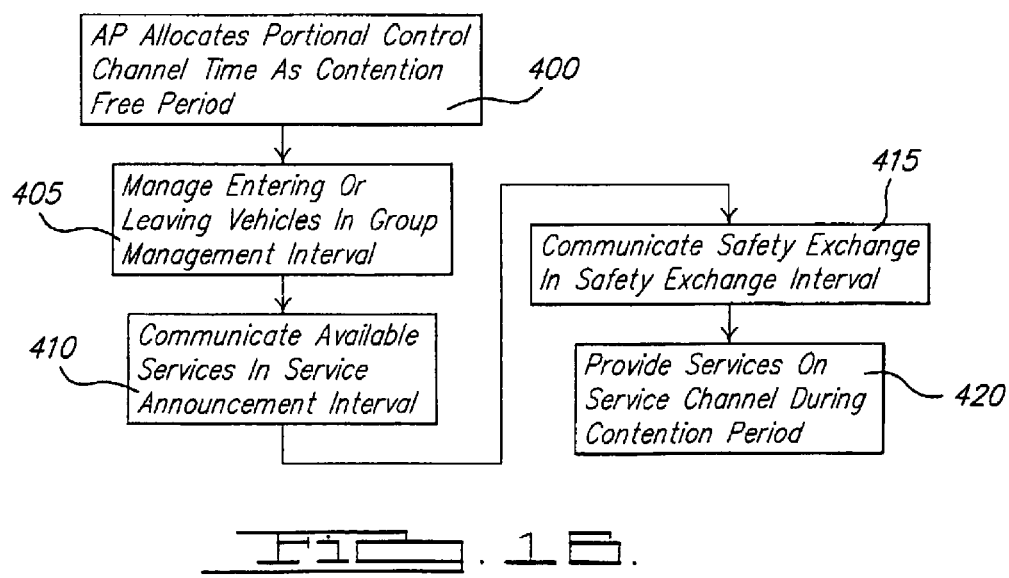
FIG. 16 is a flowchart of a method of using an integrated coordinating access point, according to the system and method of the present invention.
Figure 17:
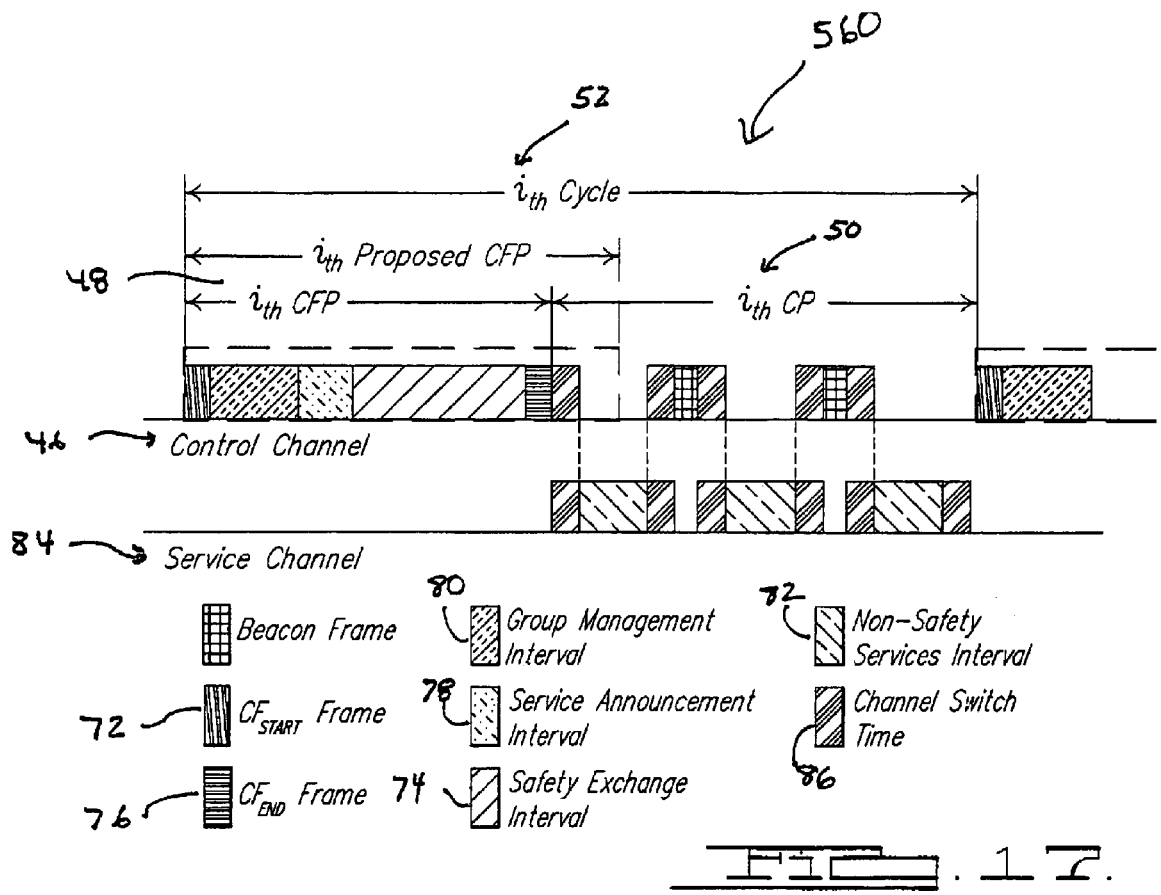
FIG. 17 is a diagram illustrating the method of FIG. 16 for the control channel and service channel, according to the present invention.

Referring to FIGS. 16 and 17, an example of a method of coordinating communications using an integrated coordinating access point is provided. In this example, the access point serves as both the coordinating access point and the service channel content provider. Therefore, the coordinating access point and the service access point are integrated into one radio that operates on both the control channel and service channel as shown in FIG. 17 at 560. This method works well in an environment with low service access point density.

The methodology begins in block 400 with the integrated access point allocating a portion of the control channel time as the contention-free period. As previously described, the contention-free period 48 includes a group management interval 80, a service announcement interval 78, and a safety exchange interval 74. For example, to establish a contention-free period in the $i_{th}$ cycle, the integrated access point AP has to transmit signals in the $i-1_{th}$ cycle.

The methodology advances to block 405, and the integrated coordinating access point manages vehicles entering or leaving the region during the group management interval. As previously described, the entering vehicles notify the integrated coordinating access point of their presence in order to schedule the appropriate vehicle transmission times during the safety exchange.

The methodology advances to block 410, and the integrated coordinated access point communicates to the vehicle the available services during the service announcement interval.

The methodology advances to block 415, and the vehicles within the region communicate their safety messages in the safety exchange interval 74. It should be appreciated that only one vehicle at a time transmits their safety message, in the order and at the time set by the integrated coordinating access point. In this example there is a predetermined time delay, or space 86, between transmissions to allow adequate time for each vehicle to reset its hardware from a transmit state to a receive state.

The methodology advances to block 420 and the contention period 50 begins and the integrated coordinating access point provides services on the service channel 84. The integrated coordinating access point may periodically return to the control channel 50 to transmit a signal. It should also be appreciated that during the contention period, a vehicle outside of the service region may complete their safety exchange.

As shown in FIG. 17, the method is iterative, so that when the contention period 50 expires, the contention-free period 48 of a new cycle will begin. The integrated coordinating access point transmits a signal indicating the start of the contention-free period 48 with sufficient power to be received by every vehicle 22 in the region 54. Similarly, the integrated coordinating access point 44 may transmit a signal indicating the start of the group management interval 80, and the length of time. The signal has sufficient strength to be received by every vehicle within the region. Preferably, the signal includes the length of the group management interval 80. Any vehicles entering or leaving the service region and receiving a communication will notify the access point of its change in status during this interval. At the end of the group management interval 80, the service announcement interval 78 is started, whereby the integrated access point transmits the list of offered services to each vehicle in the region. The service announcement interval 78 is followed by the safety exchange interval 74, where each and every vehicle on the group management list is given an opportunity to transmit. The contention-free period ends after the safety exchange. The integrated coordinating access point 44 transmits a signal with enough power to reach every vehicle in the region to notify them that the contention-free period has ended. Then, the access point will switch to the designated service channel and begin to offer its services. Vehicles within the region with knowledge of the next contention-free period schedule may be permitted to leave the control channel. Vehicles outside of the region are free to complete or begin their safety exchange.

Figure 18:
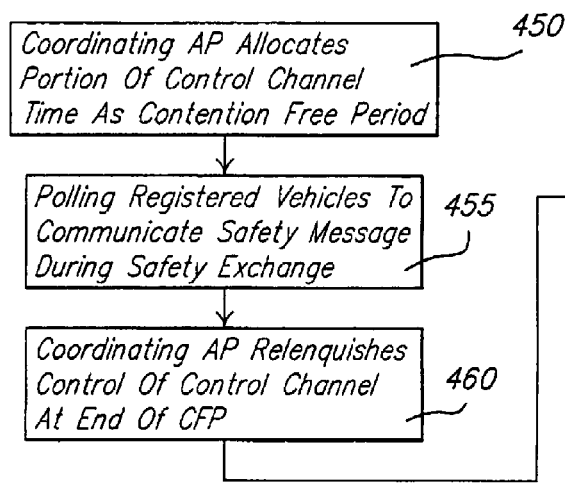
FIG. 18 is a flowchart of a method of using a dedicated coordinating access point, according to the system and method of the present invention.
Figure 19:
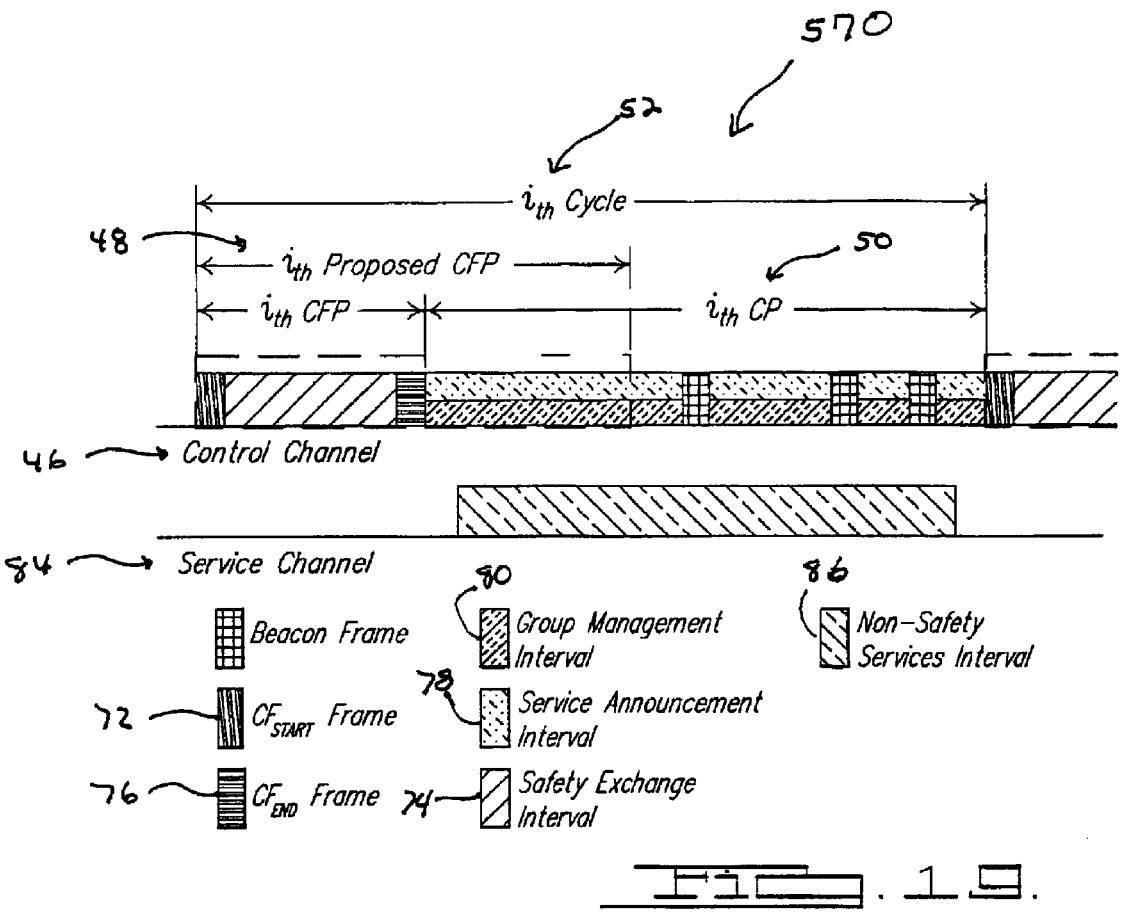
FIG. 19 is a diagram illustrating the method of FIG. 8 for the control channel and service channel, according to the present invention.

Referring to FIGS. 18 and 19, an example of a method of coordinating communications using a group manager 99 is provided. In this example, the coordinating access point serves as a group manager that partitions vehicles around the service access point into various groups. Each group receives different instruction from the group manager 99. Preferably, the group manager 99 and the service access point 40 operate on the control channel and service channels respectively. This method works well in an environment with high service access point density. The group manager 99 coordinates the transmission within a predetermined area. It should be appreciated that a single access point may be both a service access point and a group coordinating access point. The service access point 40, as previously described provides non-safety services within an access point service region. The service access point will advertise services in the control channel but conduct the transactions in the service channel. Vehicles exchange safety communications with other vehicles within their vehicle safety message range. The methodology provides for acceptable probability of reception failure for a predetermine transmitter receiver distance L and message delay requirement, which is the probability that a randomly selected message transmitted by a randomly selected vehicle will not be received by a randomly selected received at distance L within time α. The available service transaction time is the predetermined length of time a vehicle within the service region stays on the service channel while meeting the required probability of reception failure for safety purposes. This relationship may be described as:

$$ASTT = \frac{P_{service\_channel}}{P} \text{ for } PRF_{actual} \leq PRF_{specified},$$

where $PRF_{actual}$ is the PRF of the system, $PRF_{specified}$ is the PRF specified by safety, P is any time period and $P_{service\_channel}$ is the faction of time the vehicle within the service region stays in the service channel within the time period P.

For vehicles within the service region, low PRF is a desirable for safety and while high ASTT is preferable for non-safety services. Uncoordinated service channel access can create unacceptable PRF for safety. For instance, if two vehicles within VSMR of each other accessed the control channels out of phase (e.g. one transmits on the control channel while the other is conducting services on the service channel), they would not be able to receive safety message from each other. Therefore, their active safety systems became ineffective.

The methodology begins in block 450 with the group manager 99 allocating a portion of the control channel time as the contention-free period to provide safety exchanges to each vehicle in the predetermined region. The contention-free period 48 only includes a safety exchange interval 74. The group management interval 80 and service announcement interval 78 have been relocated to the contention period. As a result, the contention-free period is shorter, so that the contention period is longer. This enables the vehicle to receive more service messages.

The methodology advances to block 455, and the dedicating coordinating access point 44 polls registered vehicles in the group to communicate their safety message during the safety exchange portion of the contention-free period, as previously described.

The methodology advances to block 460, and the group manager 99 relinquishes control of the control channel at the end of the contention-free period.

The methodology advances to block 465 and the contention period 50 begins and the service access point 40 provides services on the service channel. During the contention period 50, the group manager doesn't have to switch channels for transmission, and the service access point may provide continuous service on a service channel.

For example, during the contention period, vehicles within service access point region receive services, while vehicles outside of the service access point region may perform their safety exchange, and the coordinating access point may communicate the schedule of the next contention-free period.

It should be appreciated that each vehicle within the access point service region is expected to return to the control channel for the next contention-free period. Vehicles outside of the access point service region will do their safety exchange in their default Ad-Hoc based protocol until the beginning of the next CFP. The coordinating access point will periodically transmit a signal containing a start time and the duration of the next contention-free period. Any vehicle receiving at least one signal will be regulated by the access point in the next contention-free period.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of vehicular wireless communication over a Dedicated Short Range Communication service band using an integrated coordinating access point, said method comprising the steps of:
dividing the service band into a control channel for transmitting a safety communication, and a service channel for transmitting a non-safety communication;
defining an integrated coordinating access point that is both a coordinating access point and a service access point that transmits and receives non-safety communications, and the integrated coordinating access point operates on both the control channel and the service channel;
subdividing the control channel into intervals of time, wherein one interval is a safety exchange interval in a contention-free period of time and each registered vehicle transmits a safety communication at a predetermined time during the safety exchange interval, and the predetermined time is determined by the integrated coordinating access point;
determining if the vehicle is within communications range of an integrated coordinating access point service region;
determining if the vehicle is registered with the integrated coordinating access point, if the vehicle is within the communications range of the integrated coordinating access point, wherein the integrated coordinating access point maintains a list of registered vehicles, and registering the vehicle with the integrated coordinating access point if not registered;
determining if a current time is within the safety exchange interval in the contention-free period of time in the control channel, and transmitting the safety communication by each registered vehicle during the safety exchange interval at the predetermined time for each registered vehicle, if the current time is within the safety exchange interval of the contention-free period;
determining if the safety communication exchange by every registered vehicle is completed, and permitting the vehicle to leave the control channel if the safety communication exchange is complete; and
determining if a current time is within a contention period, and transmitting the non-safety communication if the current time is within the contention period.

2. A method as set forth in claim 1 further including the step of:
communicating a safety communication on an ad hoc schedule if the vehicle is not within the integrated coordinating access point service region.

3. A method as set forth in claim 1 wherein the safety communication and non-safety communication are transmitted via a broadcast over the Dedicated Short Range Communication service band by a radio.

4. A method as set forth in claim 1 further including the step of determining if the vehicle is leaving the region, and removing the vehicle from the list of registered vehicles if the vehicle is leaving the region.

5. A method as set forth in claim 1 wherein said step of dividing the control channel into intervals further includes the steps of:
defining a group management interval and a service announcement interval within the contention-free period wherein the integrated coordinated access point communicates the available services during the service announcement interval of the contention-free period; and
defining a non-safety services interval in the service channel within a contention period, wherein the integrated coordinating access point provides services on the service channel during the contention period.

6. A method as set forth in claim 5, wherein said integrated coordinating access point periodically returns to the control channel from the service channel during the contention period.

7. A method as set forth in claim 1 wherein said step of registering the vehicle within the region further includes the steps of:
updating the registered vehicle list by adding the vehicle to the registered vehicle list if determined that the vehicle is entering the region, or removing the vehicle from the registered vehicle list if determined that the vehicle is leaving the region.

8. A system of vehicular wireless communication over a Dedicated Short Range Communication service band using an integrated coordinating access point within a region comprising:
a navigation means on the vehicle that is in communication with a global positioning system which includes a global positioning transceiver associated with the vehicle, and a global positioning signal transmitter in communication with the vehicle global positioning transceiver;
a processor on the vehicle that is in communication with said navigation means;
an input means in communication with said processor;
a user notification device operatively in communication with said navigation means for providing information to a vehicle operator;
a user manual input mechanism operatively in communication with said navigation means transmitting information from the vehicle operator;
a communication means operatively in communication with said navigation means for transmitting a message over a channel on the Dedicated Short Range Communication service band via a wireless communications link, wherein the channel is divided into a control channel for communicating a safety communication and a service channel for communicating a non-safety communication, and the control channel is further subdivided into a contention-free period and a contention period, and the contention-free period and is subdivided into a group management interval, a service announcement interval and a safety exchange interval of time and the contention period is subdivided into a non-safety service interval of time;
an integrated coordinating access point operatively in communication with the vehicle via said communications link within the integrated coordinating access point region, wherein the integrated coordinating access point service region is a geographic area containing the integrated coordinating access point and said integrated coordinating access point determines the predetermined time for each registered vehicle on a registration list maintained by the integrated coordinating access point within communications range of the access point to transmit a safety communication during the safety exchange interval.

9. A system as set forth in claim 8 wherein:
said region is a circular area with a integrated coordinating access point at a center of the region, and the integrated coordinating access point transmits a first signal in an access point service range, a second signal in an access point quiet range, a third signal in an access point poll range, a fourth signal in an access point safety exchange range, and a fifth signal in an access point service range;
a first vehicle is located within the region and transmits a signal in a vehicle safety message range; and
a second vehicle is located within the region and transmits a signal in a maximum interference range.

10. A system as set forth in claim 9 wherein the first signal transmitted by the integrated coordinating access point contains a start and a stop time of the next contention-free period.

11. A system as set forth in claim 8 wherein said vehicle transmits the safety communication on an ad-hoc basis when the vehicle is not registered with the access point.

12. A system as set forth in claim 8 wherein said integrated coordinating access point provides services on the service channel during the contention period.

13. A system as set forth in claim 12 wherein said integrated coordinating access point periodically returns to the control channel during the contention period.

14. A method of vehicular wireless communication over a Dedicated Short Range Communication service band using an integrated coordinating access point, said method comprising the steps of:
dividing the service band into a control channel for transmitting a safety communication, and a service channel for transmitting a non-safety communication;
defining an integrated coordinating access point that is both a coordinating access point and a service access point that transmits and receives non-safety communications, and the integrated coordinating access point operates on both the control channel and the service channel;
subdividing the control channel into intervals of time, wherein one interval is a safety exchange interval in a contention-free period of time and each registered vehicle transmits a safety communication at a predetermined time during the safety exchange interval, and the predetermined time is determined by the integrated coordinating access point;
defining a group management interval and a service announcement interval within the contention-free period wherein the integrated coordinated access point communicates the available services during the service announcement interval of the contention-free period;
defining a non-safety services interval in the service channel within a contention period, wherein the integrated coordinating access point provides services on the service channel during the contention period;
determining if the vehicle is within communications range of an integrated coordinating access point service region;
determining if the vehicle is registered with the integrated coordinating access point, if the vehicle is within the communications range of the integrated coordinating access point, wherein the integrated coordinating access point maintains a list of registered vehicles, and registering the vehicle with the integrated coordinating access point if not registered;
determining if a current time is within the safety exchange interval in the contention-free period of time in the control channel, and transmitting the safety communication by each registered vehicle during the safety exchange interval at the predetermined time for each registered vehicle, if the current time is within the safety exchange interval of the contention-free period;
determining if the safety communication exchange by every registered vehicle is completed, and permitting the vehicle to leave the control channel if the safety communication exchange is complete; and
determining if a current time is within a contention period, and transmitting the non-safety communication if the current time is within the contention period.

15. A method as set forth in claim 14 further including the step of:
communicating a safety communication on an ad hoc schedule if the vehicle is not within the integrated coordinating access point service region.

16. A method as set forth in claim 14 wherein the safety communication and non-safety communication are transmitted via a broadcast over the Dedicated Short Range Communication service band by a radio.

17. A method as set forth in claim 14 further including the step of determining if the vehicle is leaving the region, and removing the vehicle from the list of registered vehicles if the vehicle is leaving the region.

18. A method as set forth in claim 14, wherein said integrated coordinating access point periodically returns to the control channel from the service channel during the contention period.

19. A method as set forth in claim 14 wherein said step of registering the vehicle within the region further includes the steps of:
updating the registered vehicle list by adding the vehicle to the registered vehicle list if determined that the vehicle is entering the region, or removing the vehicle from the registered vehicle list if determined that the vehicle is leaving the region.

20. A method of wireless communication between an access point and a plurality of vehicles comprising the steps of:
a) transmitting a timing signal from the access point to the vehicles signifying the initiation of a contention free period followed by a contention period,
b) transmitting a polling signal from the access point to the vehicles during the contention free period,
c) each vehicle receiving said polling signal and transmitting a safety signal only when polled,
d) said vehicles and/or said access point transmitting service information during said contention period, and
e) iteratively repeating steps a) through d).

* * * * *

UNITED STATES PATENT AND TRADEMARK OFFICE
CERTIFICATE OF CORRECTION

| | | |
|---|---|---|
| PATENT NO. | : 7,970,540 B2 | Page 1 of 1 |
| APPLICATION NO. | : 11/718865 | |
| DATED | : June 28, 2011 | |
| INVENTOR(S) | : Kenneth P. Laberteaux et al. | |

It is certified that error appears in the above-identified patent and that said Letters Patent is hereby corrected as shown below:

Column 6, Line 30, Replace "CFP" with --(CFP)--

Column 6, Line 30, Replace "is" with --it--

Column 6, Line 35, Replace "predetermine" with --predetermined--

Column 9, Line 36, Replace "such" with --such as--

Column 9, Line 51, Insert --not-- after is

Column 11, Line 35, Replace "transits" with --transmits--

Column 11, Line 35, Replace "predetermine" with --predetermined--

Column 12, Line 5, Insert --.-- after environment

Column 12, Line 42, Insert --the-- after for

Column 14, Line 7, Replace "predetermine" with --predetermined--

Column 14, Line 11, Delete "by a randomly selected received"

Column 14, Line 24, Replace "faction" with --fraction--

Column 14, Line 26, Replace "a" with --is--

Column 14, Line 33, Delete "message" after safety

Signed and Sealed this

Twentieth Day of December, 2011

David J. Kappos
*Director of the United States Patent and Trademark Office*